US011500431B2

(12) United States Patent
Foustok

(10) Patent No.: US 11,500,431 B2
(45) Date of Patent: Nov. 15, 2022

(54) SECURE LOCAL APPLICATION COMMUNICATION BRIDGE

(71) Applicant: PPIP LLC, Chandler, AZ (US)

(72) Inventor: Mohamad Ahmad Foustok, Parkland, FL (US)

(73) Assignee: PPIP, LLC, Chandler, AZ (US)

( * ) Notice: Subject to any disclaimer, the term of this patent is extended or adjusted under 35 U.S.C. 154(b) by 169 days.

(21) Appl. No.: 17/105,336

(22) Filed: Nov. 25, 2020

(65) Prior Publication Data
US 2021/0294393 A1 Sep. 23, 2021

Related U.S. Application Data

(60) Provisional application No. 62/993,375, filed on Mar. 23, 2020.

(51) Int. Cl.
H04L 9/32 (2006.01)
G06F 1/18 (2006.01)
G06F 21/32 (2013.01)
G06F 21/62 (2013.01)
H04L 9/40 (2022.01)
G06F 21/60 (2013.01)
H04L 9/08 (2006.01)

(52) U.S. Cl.
CPC ............. G06F 1/182 (2013.01); G06F 21/32 (2013.01); G06F 21/606 (2013.01); G06F 21/62 (2013.01); H04L 9/0894 (2013.01); H04L 9/3268 (2013.01); H04L 63/0884 (2013.01)

(58) Field of Classification Search
CPC ... H04L 9/3226; H04L 9/0825; H04L 9/3213; H04L 9/3278; H04L 9/0894
See application file for complete search history.

(56) References Cited

U.S. PATENT DOCUMENTS

| 2001/0055978 | A1* | 12/2001 | Herrod ................... G06F 1/163 455/403 |
| 2006/0020559 | A1* | 1/2006 | Steinmetz ................ G07C 9/21 705/67 |
| 2009/0132813 | A1* | 5/2009 | Schibuk ............. G06Q 20/4014 726/9 |
| 2016/0065650 | A1* | 3/2016 | Pahwa ................ G06F 16/9535 709/219 |
| 2016/0112514 | A1* | 4/2016 | Prakash Usgaonkar ..................... H04L 45/306 709/217 |
| 2017/0230507 | A1* | 8/2017 | Paolini-Subramanya ................... H04M 3/56 |

(Continued)

Primary Examiner — J. Brant Murphy
(74) Attorney, Agent, or Firm — Fernando & Partners, LLP

(57) ABSTRACT

In accordance with some embodiments, a secure local application communication method is performed at a first apparatus that includes a housing arranged to hold a second apparatus, a controller, a communication interface, and a non-transitory memory storing a matrix. The secure local application communication method includes detecting, via the communication interface, a request originating from a first application executing on the second apparatus to communicate with a second application on the second apparatus. The method further includes determining whether or not to allow the request based on the matrix. The method additionally includes allowing transportation of packets from the first application to the second application in accordance with a determination of allowing the request.

20 Claims, 6 Drawing Sheets

(56) References Cited

U.S. PATENT DOCUMENTS

2020/0387594 A1\* 12/2020 Sandstrom .............. G06F 21/36
2022/0051778 A1\* 2/2022 Kuhni ...................... G06N 3/08

\* cited by examiner

SECURE LOCAL APPLICATION COMMUNICATION BRIDGE

PRIORITY CLAIM

This application claims priority to U.S. provisional patent application No. 62/993,375 filed on Mar. 23, 2020, the contents of which are hereby incorporated by reference.

TECHNICAL FIELD

This relates generally to the field of security, and more specifically, providing a location application communication bridge to allow secure local application communication.

BACKGROUND

Some smartphones are designed to restrict the local exchange of application data on a single device. On such devices, it difficult for one or more developers, whose combined product offering includes multiple applications, to share information locally.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
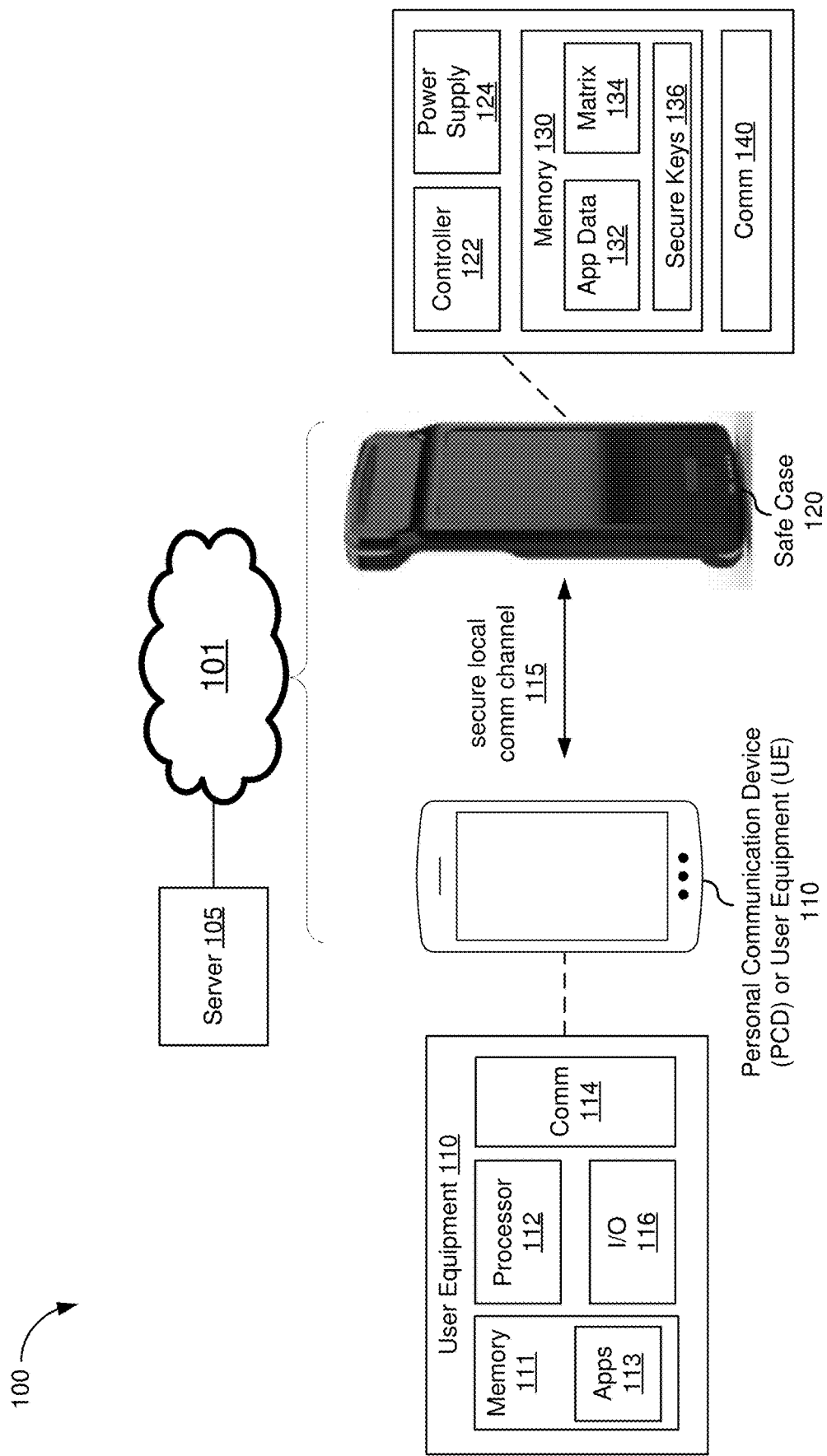
FIG. 1 is a block diagram of an exemplary secure local application communication system in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

A safe case described herein enables secure local application communications without compromising security. In some embodiments, the safe case, which holds a personal communication device, stores information for each application executing on the personal communication device in a matrix. Based on the information in the matrix, the safe case has fine-grained access control over resources on the personal communication device. For example, the matrix can specify which applications are allowed to communicate with other applications and/or conditions to allow such communications. When one application on the personal communication requests to communicate with another application on the personal communication device, based on the information in the matrix, the safe case determines whether to establish a secure local application communication bridge to allow such communications. In some embodiments, the safe case is capable of providing continuous multi-factor authentication (CMFA) of a user of the personal communication device. In such embodiments, the safe case updates the matrix based on the results from continuous multi-factor authentication. As a result, the safe case can control when, whether, and under what conditions to allow or not allow local application communications on the personal communication device.

In some embodiments, a method is performed at a first apparatus with a housing arranged to hold a second apparatus, a controller, a communication interface, and a non-transitory memory storing a matrix. The method includes detecting, via the communication interface, a request originating from a first application executing on the second apparatus to communicate with a second application on the second apparatus. The method further includes determining whether or not to allow the request based on the matrix. The method additionally includes allowing transportation of packets from the first application to the second application in accordance with a determination of allowing the request.

In accordance with some embodiments, a device includes one or more processors, non-transitory memory, and one or more programs; the one or more programs are stored in the non-transitory memory and configured to be executed by the one or more processors, and the one or more programs include instructions for performing or causing performance of the operations of any of the methods described herein. In accordance with some embodiments, a non-transitory computer readable storage medium has stored therein instructions which, when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when", "upon", "in response to determining", or "in response to detecting", depending on the context. Similarly, the phrase "if it is determined" or "if [a stated condition or event] is detected" is, optionally, construed to mean "upon determining", "in response to determining", "upon detecting [the stated condition or event]," or "in response to detecting [the stated condition or event]," depending on the context.

It should be appreciated that in the development of any actual embodiments (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram illustrating an exemplary secure local application communication system 100 in accordance with some embodiments. In some embodiments, the secure local application communication system 100 includes a personal communication device 110 (also known as a PCD, a user equipment (UE) or a user device) and a safe case 120 (also known as an active case, an active base, a case, an active case, or a secure case) that is a distinct device from the personal communication device 110. In some embodiments, the safe case 120 is connectable to a server 105 through a network 101. In some embodiments, the server 105 is a secure cloud that remotely monitors and/or controls the personal communication device 110 via the safe case 120. Accordingly, the server 105 is also referred to hereinafter as the secure server 105 or the secure cloud 105.

In some embodiments, the safe case 120 includes a housing arranged to hold the personal communication device 110 (e.g., a smartphone, wearable, tablet, etc.). In some embodiments, the housing includes a plurality of components mateable with one another. The safe case 120 can have one or more moveable components (e.g., a hood) operable to, for example, slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure (partial or whole) that at least partially supports and holds the personal communication device 110. In other words, the plurality of components of the safe case 120, once mated with one another, can form the housing assembly to receive and hold the personal communication device 110.

When in certain position(s), the housing, along with other components of the safe case 120, protects the personal communication device 110 against tracking or spying, e.g., by audio jamming, camera covering, and/or RF shielding, etc. Moreover, when in such positions, the safe case 120 provides a secure local application communication bridge for applications executing on the personal communication device 110 in accordance with some embodiments. When the one or more moveable components of the housing assembly are in certain other position(s) (e.g., hood slid up), a user can take the personal communication device 110, which is a distinct device as will be described in further detail below, out of the housing and place the personal communication device 110 in a non-protected mode. In such positions, without the local application communication bridge, the personal communication device 110 does not allow direct communication and/or application data sharing among applications executing on the personal communication device 110, e.g., by forming a sandbox around each application in accordance with some embodiments.

In some embodiments, the safe case 120 includes one or more communication devices 140 at least partially supported by the housing of the safe case 120. In some embodiments, the one or more communication devices 140 include one or more local communication devices, such as a WiFi modem, a BT/BLE radio, an infrared radio, an NFC radio, or a Lightning® (a registered trademark of Apple Inc., Cupertino, Calif.) connector, etc., that are operable to provide a secure local communication channel 115 (e.g., wirelessly or via physical connection) between the safe case 120 and the personal communication device 110. In some embodiments, the connections to and from the safe case 120 carry an end-to-end encryption to ensure security. In one direction, the secure local communication channel 115 carries information from the personal communication device 110 to the safe case 120 for monitoring, validation, authentication, authorization, and/or permission. In the other direction, the secure local communication channel 115 carries information from the safe case 120 to the personal communication device 110 for the control of activities on the personal communication device 110 and/or to supplement the functionalities of the personal communication device 110.

In addition to the local communication capability, the one or more communication devices 140 are also capable of remote communication with remote sources, e.g., the server 105, including but not limited to Global Positioning System (GPS), cellular communication, such as long term evolution (LTE), wideband code division multiple access (W-CDMA), code division multiple access (CDMA), time division multiple access (TDMA), or Global System for Mobile Communications (GSM), etc. In some embodiments, leveraging information exchanged with the server 105, the safe case 120 validates the communications on the personal communication device 110 and bridges secure local application communication accordingly to validation results and/or policy configurations.

In some embodiments, the safe case 120 includes a non-transitory memory 130. In some embodiments, the non-transitory memory 130 includes at least one secure portion storing keys. In some embodiments, secure keys 136 are stored in the secure portion of the memory 130 and never leave the safe case 120. For example, trusted hash signatures for application execution are generated based on a hardware root of trust, e.g., using a specialized system and crypto architecture to create a root key. In some embodiments, the safe case 120 uses a hardware true random number generator and stores the root key in the secure portion of the memory 130, e.g., stored as part of the secure keys 136. As such, the root key, along with other secure keys 136, is not exposed to other devices and cannot be externally extracted. In some embodiments, the safe case 120 can also generate certificates, e.g., based on secure keys 136, in response to certificate signing requests. The certificates are used as the trusted hash signatures for applications and local application communications. Accordingly, an appropriate certificate bundle (e.g., a X.509 certificate bundle) can be produced, provisioned, and stored within the safe case 120 to maintain stringent control of allowed processes for execution and communication.

In some embodiments, in addition to the secure keys 136, the memory 130 also stores application data 132 for applications executing on the safe case 120 and/or on the personal communication device 110. Having the application data 132 stored on the safe case 120 has the advantage of allowing offline local application communications and allowing the safe case 120 to control when to supply the application data to the applications on the personal communication device 110 and whether to supply the application data in accordance with a matrix 134.

In some embodiments, the memory 130 includes the matrix 134 to facilitate the control of local application communications. In some embodiments, the matrix 134 is associated with policies configured for the applications on the personal communication device 110, e.g., allowing or not allowing communications and/or data sharing between two applications, when to allow the communication, when to cease the communication, under what conditions to allow or cease the communication, etc. For instance, when an application on the personal communication device 110 initiates a local application communication request, upon identifying an application identifier and/or a signature of the application, the safe case 120 retrieves entries in the matrix 134 associated with the identifier and/or signature of the application in order to determine whether to establish a secure local application communication bridge to allow the request.

In some embodiments, the safe case 120 includes a controller 122 coupled to the communication device(s) 140. Embodiments of the controller 122 include hardware, software, firmware, or a combination thereof. In some embodiments, the controller 122 is operable to manage the secure local communication channel 115 between the personal communication device 110 and the safe case 120. In addition to managing the secure local communication channel 115, the controller 122 logs data in a secure area of the safe case 120, e.g., in the secure part of the memory 130. Logging data in the secure area of the safe case 120 has the advantage of providing trustworthy status reports of the personal communication device 110 for analysis in case the personal communication device 110 is compromised. Particularly, many high-value enterprises invest significantly to implement tight monitoring and access control within their own networks, but lose visibility and control to external networks such as the cellular networks or WiFi hotspots. Once a smartphone is compromised, the status report from the operating system on the personal communication device 110 may not be trustworthy. Instead, relying on the logged data in the secure area of the safe case 120, Enterprise Mobility Management (EMM) can obtain reliable status reports. EMM can then take action to limit the threat spread based on the reliable status reports.

In some embodiments, the safe case 120 includes a power supply 124. The power supply 124 provides power to a peripheral interface (e.g., an interface to supplemental functional modular devices attachable to the safe case 120), the communication device(s) 140, and/or the controller 122. In some embodiments, the power supply 124 includes at least one of a battery, a charging socket, a USB connector, a power plug, and/or a power socket. In some embodiments, the power supply 124 includes a connector for a battery. Though not shown in FIG. 1, in some embodiments, the power supply 124 includes a plurality of power supplying components, e.g., one battery providing power to the local communication device 114 and/or a power plug providing power to the controller 122, etc. The plurality of power supply components can be connected so that they are charged together or separately. The plurality of power supply components can also aggregate power to supply to one or more hardware electronic components of the safe case 120. Alternatively, the plurality of power supply components can separately provide power to one or more hardware electronic components of the safe case 120.

In some embodiments, the personal communication device 110 held by the safe case 120 includes a processor 112, one or more communication devices 114, an input/output interface 116, one or more sensors (not shown in FIG. 1), memory 111, and applications 113 (e.g., APIs that include instructions stored in the memory 111 and executed by the processor 112). In some embodiments, the personal communication device 110 is a portable communications device, such as a mobile phone, a wearable device, a tablet, a laptop computer, a digital media player, an electronic reader, or the like. In some embodiments, the personal communication device is a non-portable device, such as a desktop computer, a data storage device, a smart TV, a video game console, a smart home appliance or the like that is capable of storing, transmitting, and receiving data. It will be appreciated that the components, devices or elements illustrated in and described with respect to FIG. 1 may not be mandatory and thus some may be omitted in certain embodiments. Additionally, some embodiments can include further or different components, devices or elements beyond those illustrated in and described with respect to FIG. 1.

In some embodiments, the processor 112 is coupled to the one or more communication devices 114 to manage the communication path through the one or more communication devices 114, in accordance with some embodiments. In addition to managing communication, the processor 112 processes data and executes applications 113, in accordance with some embodiments. In some embodiments, the processor 112 includes one or more chips and/or chipsets embodied in a variety of forms. For example, the processor 112 can be embodied as various hardware-based processing means such as a microprocessor, a coprocessor, a controller, or other computing devices including integrated circuits, such as an ASIC (application specific integrated circuit), an FPGA (field programmable gate array), some combination thereof, or the like. Although illustrated as a single processor, it will be appreciated that the processor 112 can comprise a plurality of processors. The plurality of processors communicates with each other and collectively performs one or more functionalities. In some embodiments, the processor 112 can be configured to execute instructions that can be stored in the memory 111 or that can be otherwise accessible to the processor 112. As such, whether configured by hardware or by a combination of hardware, firmware, and software, the processor 112 is capable of performing operations according to various embodiments.

In some embodiments, the memory 111 includes one or more memory devices, including fixed and/or removable memory devices. In some embodiments, the memory 111 provides a non-transitory computer-readable storage medium for storing computer program instructions (e.g., the applications 113) to be executed by the processor 112. In some embodiments, the memory 111 exchanges information with one or more of the processor 112, the input/output interface 116, the one or more communication devices 114, or the sensors via a bus.

In some embodiments, the applications 113 stored in the memory 111 include a bridge application for establishing a secure local application communication bridge. In some embodiments, the bridge application facilitates data exchange between the personal communication device 110 and an external electronic device (e.g., the safe case 120 and/or the server 105). The data exchange includes, for example, transmitting data or a portion of the data obtained by the communication device 114 and/or the sensors to an external electronic device (e.g., the safe case 120 and/or the server 105) or receiving data from the external electronic device, e.g., the instructions from the safe case 120 and/or server 105. Thus, the bridge application facilitates local application communications among the applications 113.

In some embodiments, the personal communication device 110 does not allow direct communication and/or application data sharing among the applications 113, e.g., by placing each of the applications 113 in an isolated sandbox. Such design protects the applications 113 and the personal communication device 110 from erroneous or malicious behaviors, e.g., a poorly executed application or malware. However, it is often desirable for applications within a personal communication device to collaborate with others, e.g., an application suite from the same developer, to share resources, and/or to exchange information. In accordance with some embodiments, the safe case 120 described herein provides an alternative application communication network that allows one or more of the applications 113 on the personal communication device 110 to communicate with each other through the local application communication bridge.

Still referring to the personal communication device 110, in some embodiments, the input/output interface 116 provides a channel for input/output data between the processor 112 and input/output peripheral devices, such as a display, a keyboard, a mouse, a pen, microphones, cameras, and/or speakers of the personal communication device 110. In some embodiments, the peripheral devices are connected to the input/output interface 116 wirelessly, e.g., via the one or more communication devices 114.

In some embodiments, the one or more communication devices 114 connect the personal communication device 110 and an external electronic device wirelessly or through a wired connection. In some embodiments, the external electronic device is the safe case 120, such that the one or more communication devices 114 connect to the safe case 120 wirelessly or through a wired communication. The wireless communication includes at least one of, for example, WiFi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the personal communication device 110 includes sensors, such as one or more accelerometers, gyroscopes, and/or magnetometers (e.g., as part of an inertial measurement unit (IMU)) for obtaining information concerning the position (e.g., altitude) of the personal communication device 110, light sensors, or acoustic sensors. In some embodiments, the sensors are coupled to the input/output interface 116, such that the information collected by the sensors are passed to the processor 112 by the input/output interface 116 for further processing. For example, the input device camera uses light sensors for light sensing. In some embodiments, the sensors are coupled to the one or more communication devices 114, such that the information collected by the sensors is transmitted to another device (e.g., the safe case 120) for validation. In some embodiments, the sensors are coupled to the power supply (e.g., a battery) of the personal communication device 110 for obtaining the power level of the personal communication device 110.

In some embodiments, the safe case 120 monitors the status of the communication devices 114, I/O devices 116, and/or the sensors on the personal communication device 110. In some embodiments, a validation engine on the safe case 120 verifies the status of the microphones, camera, and/or RF isolation device when the personal communication device 110 is in a protected mode. In some embodiments, when the personal communication device 110 is held by the safe case 120, due to the close distance between the safe case 120 and the personal communication device 110, e.g., within the range of millimeters, the safe case 120 is capable of obtaining the status from the personal communication device 110 via the sensor(s), input/output device(s), and/or the communication device(s) 140 on the safe case 120.

For example, through the coupling of the communication devices 114 and 140, the safe case 120 can request and obtain the status of the microphones and camera(s) on the personal communication device 110. In another example, using RF sensing and/or receiving devices on the safe case 120 (or another modular device attached to the safe case 120 for processing RF signals), the safe case 120 can measure the RF signals sent and/or received by the personal communication device 110. Due to the close distance between the safe case 120 and the personal communication device 110, the RF signal measurement is accurate with low interference.

In some embodiments, upon receiving the status of the camera on the personal communication device 110, the validation engine checks the amount of light detected by the light sensors in order to determine whether the camera is properly covered. In some embodiments, upon obtaining the RF emission measurement by the safe case 120, the validation engine checks the amount of RF emission in order to determine the effectiveness of the RF isolation. In some embodiments, the validation engine on the safe case 120 obtains the execution status of the applications 113 and determines whether or not to establish a secure local application communication bridge to allow exchange of information among the applications 113.

Figure 2:
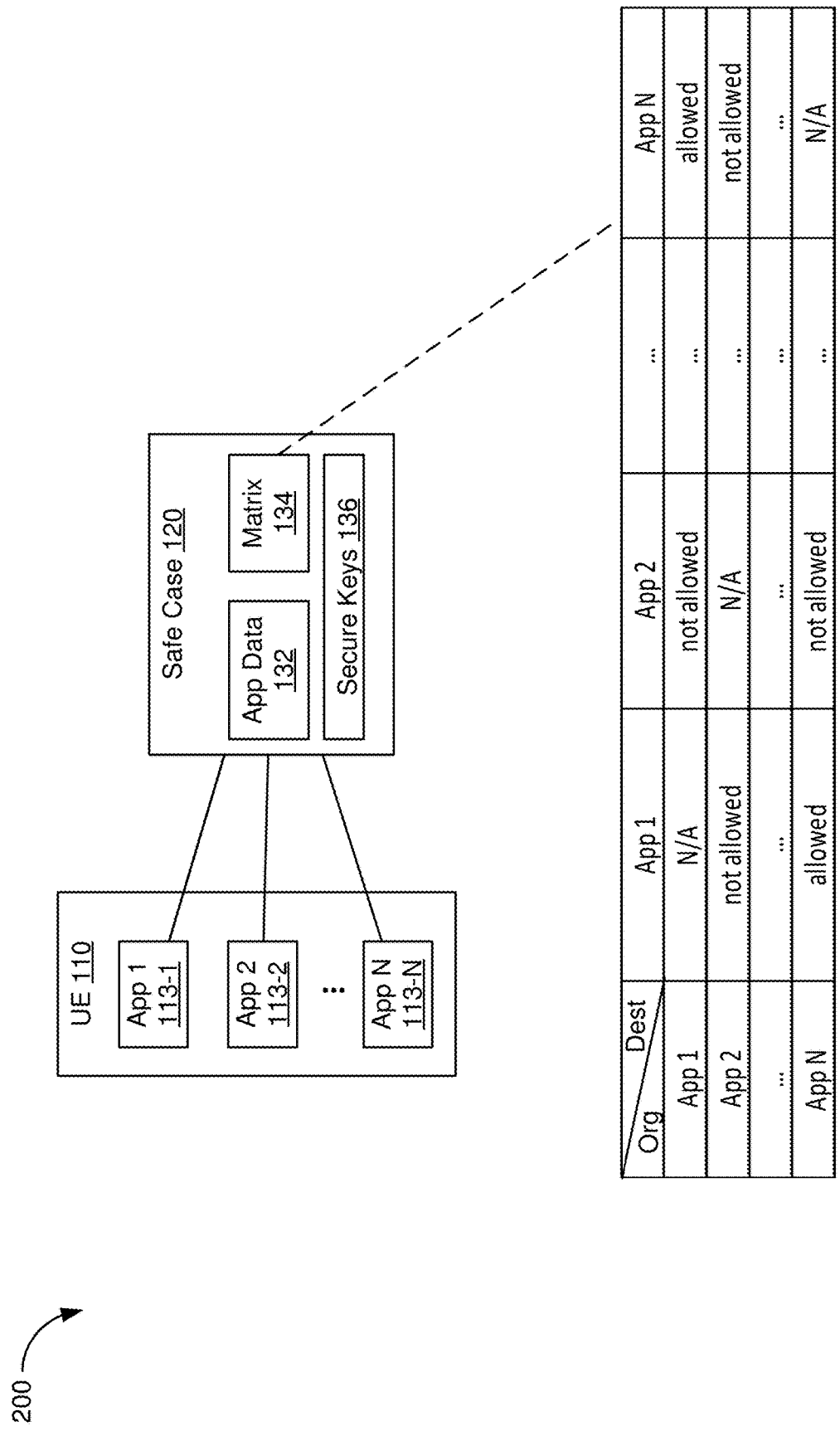
FIG. 2 is a block diagram illustrating an exemplary matrix in a local application communication system in accordance with some embodiments.

FIG. 2 is a block diagram illustrating an exemplary matrix in a local application communication system 200 in accordance with some embodiments. In some embodiments, through the secure local communication channel 115 (FIG. 1) between the personal communication device 110 and the safe case 120, the safe case 120 obtains the execution status of the applications 113, e.g., the execution status of application 1 113-1, application 2 113-2, application N 113-N, etc. In some embodiments, the safe case 120 further detects (e.g., through the secure local communication channel 115, FIG. 1) a request originating from one or more of the applications 113 to communicate with another one of the application(s) 113. Based on the matrix 134, the safe case 120 determines whether to allow the request.

For example, according to the exemplary matrix 134 shown in FIG. 2, application 1 113-1 is not allowed to communicate with application 2 113-2. As such, the safe case 120 denies a request originating from application 1 113-1 to communicate with application 2 113-2. In some embodiments, denying the request includes the safe case 120 discarding certain packets from application 1 113-1, where the packets are marked as having an origin of application 1 113-1 and a destination of application 2 113-2. As such, packets attempting to go through the blocked communication path are discarded. In another example, when the safe case 120 detects a request originating from application N 113-N to communicate with application 2 113-2, the safe case 120 denies the request and blocks any packets from application N 113-N to application 2 113-2. On the other hand, based on the matrix 134, a local application communication bridge can be established for application 1 113-1 and application N 113-N. As such, certain functionalities and/or data provided by application 1 113-1 can be shared with application N 113-N. Accordingly, when the safe case 120 detects a request to communicate with application 1 113-1 originating from application N 113-N, the safe case 120 establishes a local application communication bridge between application 1 113-1 and application N 113-N to allow the exchange of communication data.

It should be noted that though FIG. 2 illustrates permissions for bi-directional communications between applications, in some embodiments, the matrix 134 specifies permissions allowing communication in one direction but not the other. For example, the matrix 134 may specify that a request originating from application 1 113-1 to communicate with application 2 113-2 is allowed, but a request originating from application 2 113-2 to communicate with application 1 113-1 is not allowed.

Figure 3:
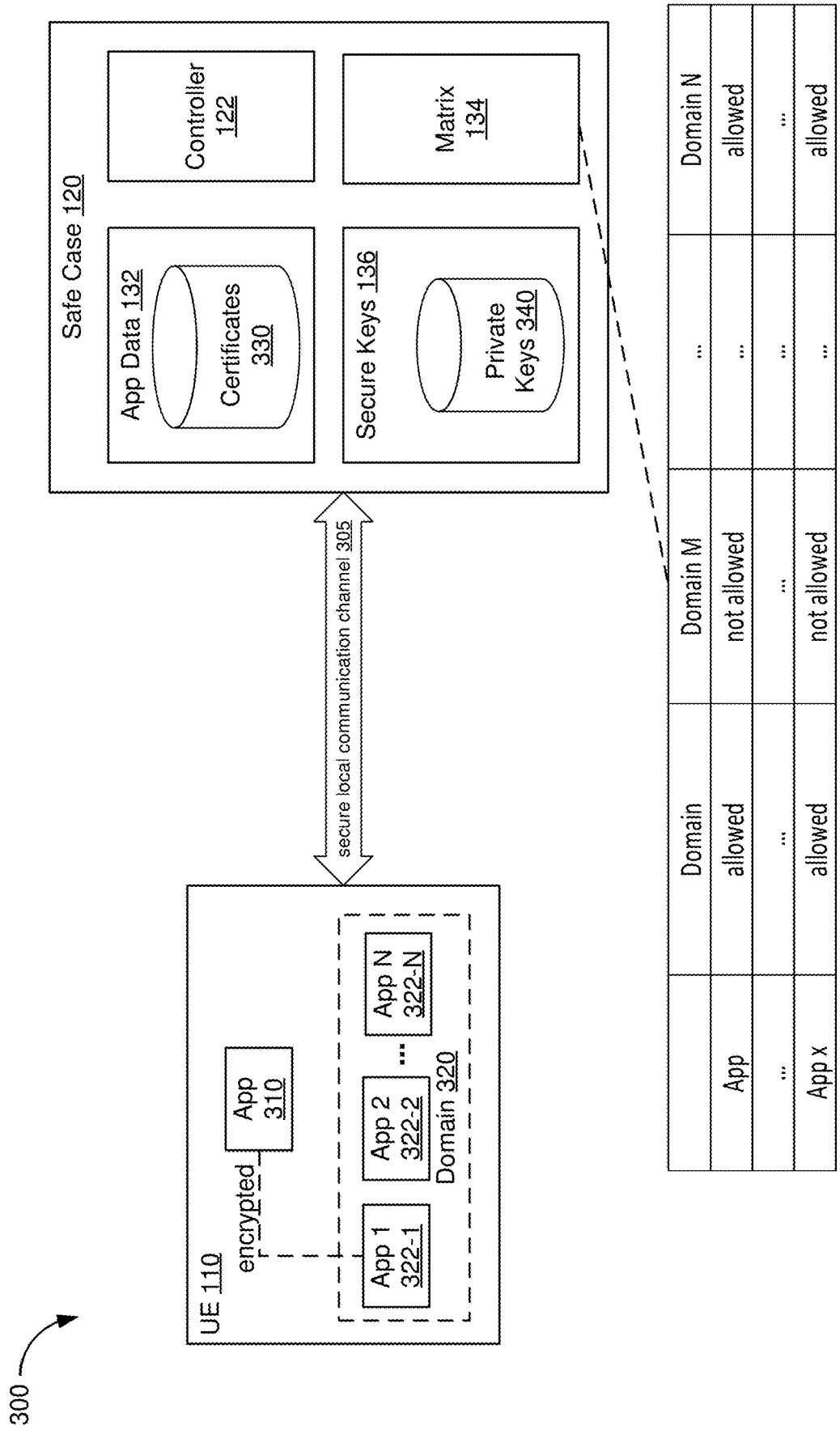
FIG. 3 is a block diagram illustrating secure local application communication using another exemplary matrix in accordance with some embodiments.

FIG. 3 is a block diagram 300 illustrating secure local application communication using an exemplary matrix in accordance with some embodiments. Applications are often packaged together for deployment, e.g., combining a plurality of applications 322 and packaging the plurality of applications 322 into one software development kit (SDK) for deployment. The underlying transport and security layers, e.g., sessions, URL transport and/or network transport layers (e.g., Bluetooth or Bluetooth Low Energy (BLE), etc., are encapsulated within the SDK. As such, each of the SDKs typically has built-in transport and security layers. In some embodiments, applications are divided into domains so that an application can interact with domain-specific application programming interfaces (APIs). In such embodiments, each of the domain-specific applications 322 can be packaged into an SDK and the set of SDKs can be associated with a domain 320. Each of the SDKs leverages data exchange communication protocols and security to enforce policies, e.g., allowing or denying local application communications when the policies are met or not met.

In some embodiments, the safe case 120 records the domain assignment in the matrix 134, e.g., application 1 322-1, application 2 322-2, . . . , application N 322-N are recorded to the domain 320 assigned in the matrix 134. In some embodiments, the matrix 134 further records whether an application can interact with the applications in one domain. For example, in FIG. 3, the matrix 134 specifies that the application 310 is allowed to communicate with any one of the applications 322 in the domain 320. Based on the information in the matrix 134, the safe case 120 controls local application communications on the personal communication device 110.

For enhanced security, the safe case 120 protects the local application communications with end-to-end encryption. In some embodiments, a secure local communication channel 305 carries encrypted data between the personal communication device 110 and the safe case 120. As such, the data transmitted between the personal communication device 110 and the safe case 120 is secure. To initiate local application communication, in some embodiments, the safe case 120 detects a request from the application 310 via the secure local communication channel 305. In response, based on the matrix 134, the safe case 120 communicates to the application 310 to allow or disallow the local application communication request via the secure local communication channel. Because the data exchange between the personal communication device 110 and the safe case 120 carry end-to-end encryption, the request forwarding and the data exchange are secure.

In some embodiments, the communications among the applications 310 and 322 are also secure. For instance, in FIG. 3, as indicated by the dotted line, the communications between the application 310 and application 1 322-1 are encrypted. In other words, a secure local communication bridge is established for the data sharing between the application 310 and application 1 322-1. The secure local application communication bridge is particularly useful for security applications.

For example, the application 310 may enable signed and encrypted email and secure web browsing through key issuance and recovery under a Public Key Infrastructure (PKI). During an initial device enrollment phase, it is desirable to share a public key between the application 310 and the applications 322 in the domain 320, including application 1 322-1. Through the secure local communication bridge, the application 310 can encrypt the public key and share data (including the public key) with the applications 322 in the domain 320. The applications 322 can then use the public key for secure email and web browsing.

In some embodiments, the resource (or a portion of the resource) shared by the applications on the personal communication device 110 is generated and/or stored in the application data 132 of the safe case 120, e.g., stored as public key(s) as part of the application data 132. Continuing the example above, as shown in FIG. 3, the safe case 120, e.g., the controller 122, can detect the request from the application 310 to communicate with one or more of the applications 322 in the domain 320. In response to detecting the request, the safe case 120 generates and/or obtains certificates 330 (e.g., based on private keys 340 and/or the secure keys 136) corresponding to the public key, e.g., using RSA, Elliptic Curve Cryptography (ECC), and/or Certificate Signing Request (CSR), etc. Further, the certificates 330 can be stored in the application data 132 for the resource sharing between the application 310 and the applications 322 in the domain 320, e.g., signing and/or decrypting during email and/or web browsing.

Figure 4:
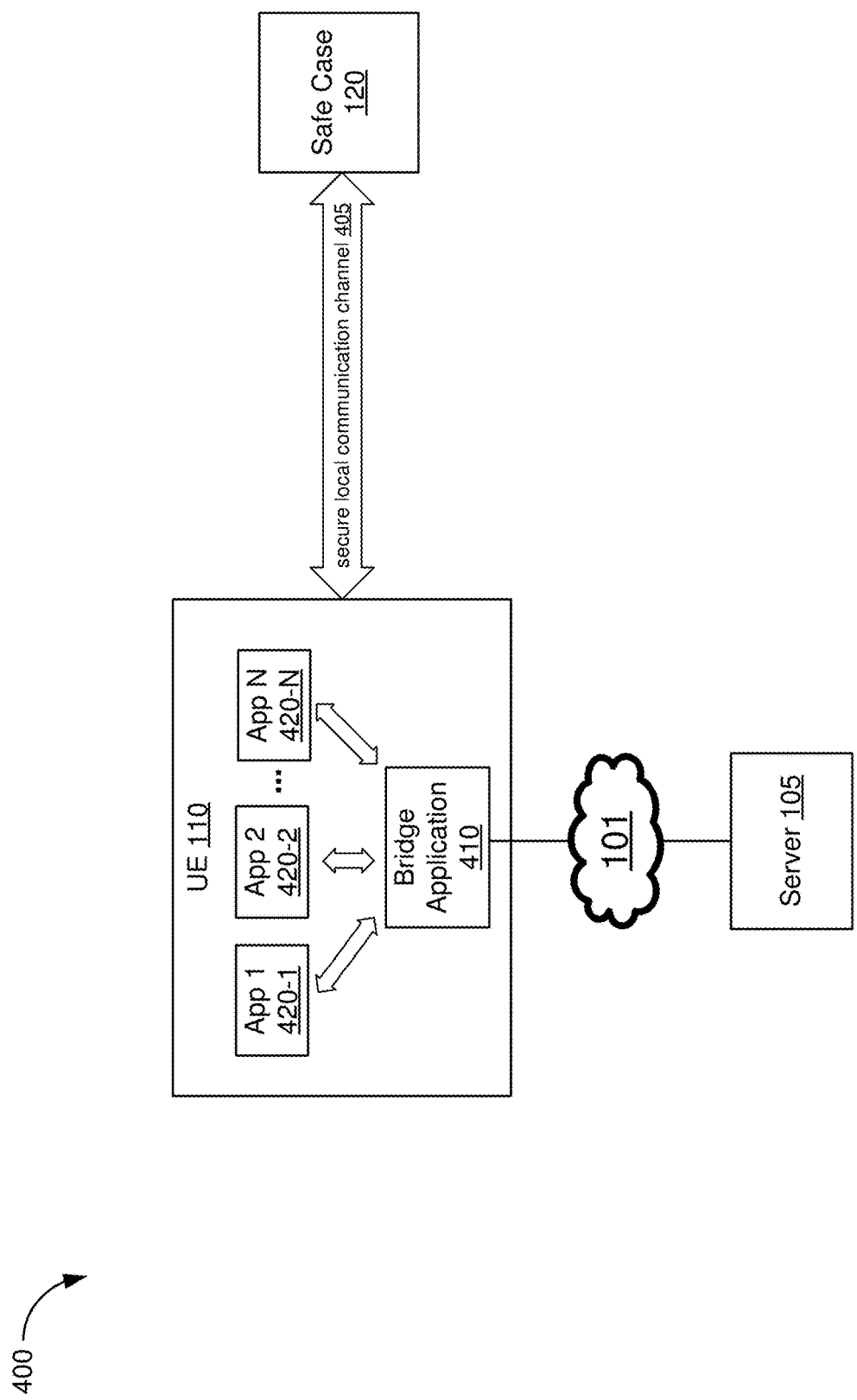
FIG. 4 is a block diagram illustrating using a bridge application in an exemplary secure local application communication system in accordance with some embodiments.

FIG. 4 is a block diagram illustrating using a bridge application 410 in an exemplary secure local application communication system 400 in accordance with some embodiments. In some embodiments, the bridge application 410 acts as a hub for the secure local application communication network. In some embodiments, the bridge application 410 is installed on the personal communication device 110 that can identify the safe case 120, e.g., for establishing a secure local communication channel 405 and/or the server 105, e.g., for establishing a secure remote communication channel As such, the bridge application 410 facilitates the safe case 120 to the secure server 105 communication through the personal communication device 110 in accordance with some embodiments.

In some embodiments, once the secure local communication channel 405 is established, the bridge application 410 detects and forwards requests for local application communication among the applications 420 to the safe case 120. In some embodiments, the bridge application 410 receives instructions from the safe case 120 to allow or deny the local application communication requests. According to the instructions, the bridge application 410 allows or denies communications and/or data sharing among the applications 420.

In some embodiments, the bridge application 410 displays a user interface on the personal communication device 110. In some embodiments, the user interface displays notifications from the safe case 120. For example, when a request for local application communication is denied, the bridge application 410 receives the notification from the safe case 120 and displays a message indicating denial of the local application communication request to the user of the personal communication device 110.

Figure 5:
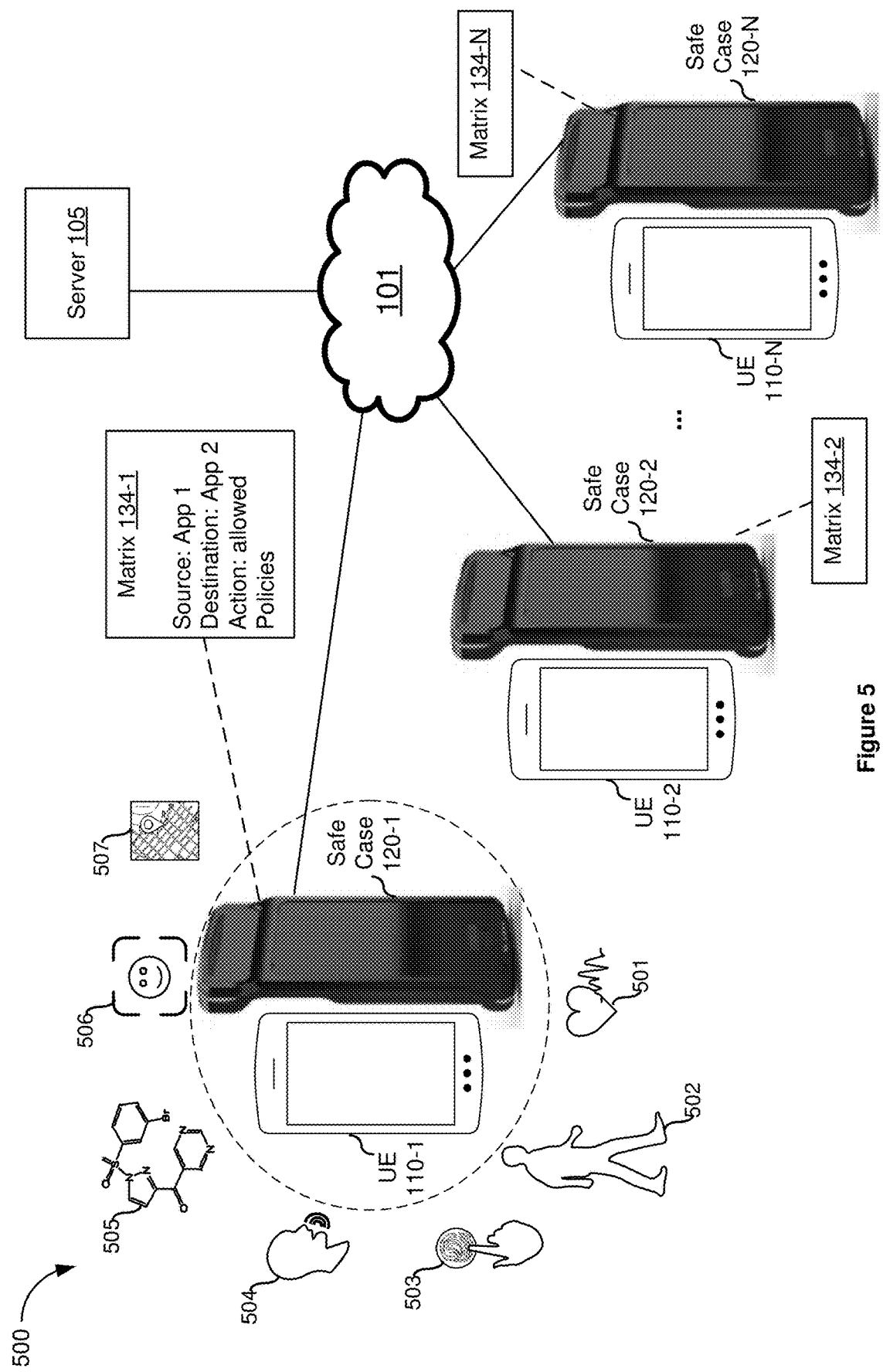
FIG. 5 is a block diagram illustrating an exemplary distributed secure local application communication system in accordance with some embodiments.

FIG. 5 illustrates an exemplary distributed secure local application communication system 500 in accordance with some embodiments. The exemplary distributed secure local application communication system 500 includes a plurality of safe cases 120, e.g., safe case 120-1, safe case 120-2, . . . , safe case 120-N. Each of the plurality of safe cases 120 includes a housing arranged to receive and hold a respective personal communication device 110, e.g., the safe case 120-1 with a housing arranged to receive and hold the personal communication device 110-1, etc. Further, to facilitate secure local application communication, each of the plurality of safe cases 120 includes a respective matrix 134, e.g., the safe case 120-1 includes the matrix 134-1, the safe case 120-2 includes the matrix 134-2, and the safe case 120-N includes the matrix 134-N, etc.

In some embodiments, as explained above with reference to FIG. 1, each of the safe cases 120 includes one or more sensors and/or is connectable to one or more sensors (e.g., the sensors on the personal communication device 110 and/or other supplemental functional devices). The sensors on the safe case 120-1 and/or the sensors on the personal communication device 110-1 collect data reflecting traits of a user of the personal communication device 110-1 and/or the operating environment, such as heart and/or pulse pattern data 501, gait pattern data 502, fingerprint data 503, voice data 504, odor/scent data 505, facial image data 506, location data 507, etc.

In some embodiments, the traits data and/or data derived from the traits data are used for continuous multi-factor authentication (CMFA). In some embodiments, during CMFA, without user intervention, a respective safe case 120 and/or the secure server 105 continuously (or periodically) evaluate the traits data and calculate an authentication score. In some embodiments, the authentication score is a function of values assigned to the multiple traits, e.g., a weighted average of the values assigned to the traits. Further, in some embodiments, based on context, the respective safe case 120 and/or the secure server 105 adjust the assigned weights based on the traits data, e.g., assigning a higher weight to traits derived from the facial image data 506 when the personal communication device 110 is in close proximity to the user, or lowering the weight assigned to traits data associated with the gait pattern data 502 when the sensors report that the user is not moving, etc. Based on the authentication score, the respective safe case 120 and/or the secure server 105 modify a respective one of the matrices 134.

In some embodiments, a respective matrix 134 captures policy configurations on a respective safe case 120. For example, the matrix 134-1 specifies policies associated with a local application communication request from application 1 to application 2. The policies may define under what conditions such local application communication is allowed and under what conditions it is not allowed. Accordingly, when the conditions are satisfied, the safe case 120-1 establishes a local application bridge to allow the communication, e.g., by directing the bridge application 410 (FIG. 4) to relay data and/or messages from application 1 to application 2. On other hand, in accordance with a determination that the conditions are not satisfied, e.g., failed authentication based on the traits data derived from the facial image data 506, not being outside a high threat area based on the location data 507, etc., the safe case 120-1 denies the request for local application communication and discards (or directs the bridge application 410 in FIG. 4 to discard) the packets from application 1 in accordance with some embodiments.

Further, as shown in FIG. 5, in some embodiments, the remote server 105 can obtain sensor data from multiple safe cases 120, e.g., through the configuration by the bridge application 410 (FIG. 4) and/or using the remote communication devices on the safe cases 120. In some embodiments, the server 105 aggregates the sensor data and applies machine learning to extract feature vectors. The server 105 further analyzes the user and/or the operating environment based on the aggregated data. Based on the aggregated data, in some embodiments, the remote server 105 directs one or more safe cases 120 to re-configure one or more matrices 134. For example, based on the analysis of aggregated data from the plurality of safe cases 120, the remote server 105 determines that it is unsafe to allow local application communications originating from certain applications at certain locations. The remote server 105, in accordance with some embodiments, directs one or more safe cases 120 at or near the locations to modify their respective matrices 134, e.g., changing the action associated with such applications from being allowed to not allowed and or updating the policies to specify geofence parameters. As such, the distributed secure local application communication system 500 maintains fine-grained control over local application communications on multiple personal communication devices 110.

Figure 6:
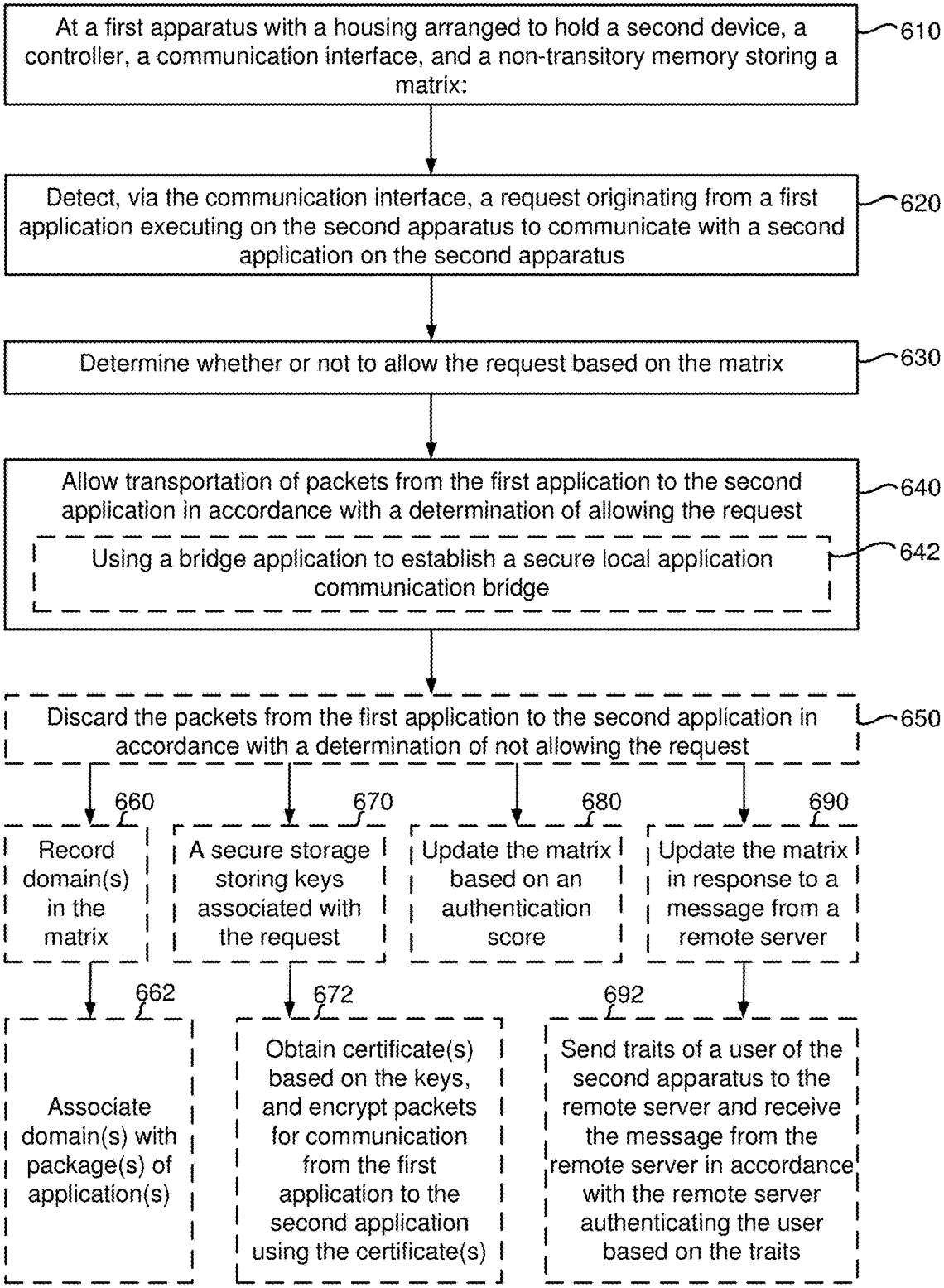
FIG. 6 is a flowchart illustrating a method of bridging secure local application communication in accordance with some embodiments.

FIG. 6 is a flowchart illustrating a method 600 of secure bridging of local application communication in accordance with some embodiments. In some embodiments, the method 600, or portions thereof, is performed by a first apparatus, e.g., the safe case 120 in FIGS. 1-4. As represented by block 610, in some embodiments, the first apparatus includes a housing that is arranged to hold a second device (e.g., the personal communication device 110, FIG. 1), a controller (e.g., the controller 122 in FIGS. 1 and 3), a communication interface (e.g., the communication device(s) 140, FIG. 1), and a non-transitory memory (e.g., the memory 130, FIG. 1) storing a matrix (e.g., the matrix 134 in FIGS. 1-3). Briefly, the method 600 includes detecting, via the communication interface, a request originating from a first application executing on the second apparatus to communicate with a second application on the second apparatus; determining whether or not to allow the request based on the matrix; and allowing transportation of packets from the first application to the second application in accordance with a determination of allowing the request.

To that end, as represented by block 620, the method 600 includes detecting, via the communication interface, a request originating from a first application executing on the second apparatus to communicate with a second application on the second apparatus. For example, in FIG. 1, when one of the applications 113 attempts to communicate with another one of the applications 113 on the personal communication device 110, the first application initiates a request to communicate with the second application. The safe case 120 establishes the secure local communication channel 115 with the personal communication device 110 and detects the request via the secure local communication channel 115.

As represented by block 630, the method 600 also includes determining whether or not to allow the request based on the matrix. For example, in FIG. 2, the safe case 120 searches entries in the matrix 134 and determines whether to allow or deny the request originating from the application 1 113-1 based on the entries in the matrix 134. Based on the entries in the exemplary matrix 134, a local application communication request originating from application 1 113-1 to the destination of application 2 113-2 is not allowed. Conversely, based on the entries in the exemplary matrix 134, a local application communication request originating from application 2 113-2 to the destination of application 1 113-1 is also not allowed. On the other hand, based on the entries in the exemplary matrix 134, a local application communication request originating from application 1 113-1 to the destination of application N 113-N is allowed, and vice versa.

As represented by block 640, the method 600 additionally includes allowing transportation of packets from the first application to the second application in accordance with a determination of allowing the request. Using the information in the exemplary matrix 134 shown in FIG. 2, in the case of detecting the request originating from application 1 113-1 to application N 113-N, the safe case 120 allows transporting packets from application 1 113-1 to application N 113-N.

In some embodiments, as represented by block 642, the method 600 further includes using a bridge application to establish a secure local application communication bridge. In such embodiments, detecting the request originating from the first application includes receiving, via a bridge application, the request originating from the first application; and allowing transportation of the packets includes instructing the bridge application to transport the packets from the first application to the second application. For example, as shown in FIG. 4, the bridge application 410 facilitates the communication between the personal communication device 110 and the safe case 120 and the management of local application communications among the applications 420 on the personal communication device 110. When the safe case 120 determines that the communication from one of the applications 420 to another one of the applications 420 is allowed based on the matrix, the safe case 120 instructs the bridge application 410 to establish a bridge for transporting the packets for such local application communications. The bridge application 410 can then transport the packets so that data from one of the applications 420 can be shared with another one of the applications 420.

In some embodiments, as represented by block 650, the method 600 further includes discarding the packets from the first application in accordance with a determination of not allowing the request. For example, using the information in the exemplary matrix 134 shown in FIG. 2, in the case of detecting the request originating from application 1 113-1 to application 2 113-2, the safe case 120 does not allow transporting packets from application 1 113-1 to application 2 113-2. In some embodiments, even if application 1 113-1 attempts to send packets to application 2 113-2, e.g., via the bridge application 410 in FIG. 4, the safe case 120 instructs the bridge application 410 to discard the packets from application 1 113-1 and not deliver the packets to application 2 113-2.

In some embodiments, as represented by block 660, the method 600 further includes classifying a plurality of applications on the second apparatus into one or more domains, and recording the one or more domains in the matrix, where an application of the plurality of applications is allowed or denied to communicate with applications within a domain of the one or more domains. In such embodiments, as represented by block 662, the method 600 further includes combining the plurality of applications into one or more packages; and associating the one or more packages with the one or more domains.

For example, as shown in FIG. 3, a plurality of applications 310 and 322 executes on the personal communication device 110, and the safe case 120 classifies the applications 322 as in the domain 320. The exemplary matrix 134 on the safe case 120 includes entries specifying communications from the application 310 on the personal communication device 110 to the applications 322 within the domain 320 are allowed. As such, based on the matrix 134, the application 310 can communicate with any of the applications 322 within the domain 320 and share its data with the applications 322. Further, each of the domain-specific applications 322 can be packaged into one SDK and the SDK can be associated with the domain 320. As such, the secure local application communication can leverage data exchange communication protocols and securities built into the SDK.

In some embodiments, as represented by block 670, the non-transitory memory includes a secure storage storing keys associated with the request. Further, in some embodiments, as represented by block 672, the method 600 includes obtaining certificates based on the keys in response to receiving the request, and encrypting packets for communication from the first application to the second application using the certificates. For example, in FIG. 3, in response to receiving a request from the application 310 to communicate with application 1 322-1, the safe case 120 obtains the certificates 330 based on the private keys 340. The safe case 120 then directs encryption of the communication from the application 310 to application 322-1 using the certificates 330.

In some embodiments, as represented by block 680, the method 600 includes updating the matrix based on an authentication score of a user of the second apparatus. In other words, the safe case determines an authentication score of a user of the second apparatus based on traits of the user. The safe case then updates the matrix based on the authentication score. For instance, in FIG. 5, the safe case 120 obtains traits of the user of the personal communication device 110-1, e.g., the heart and/or pulse pattern data 501, the gait pattern data 502, the fingerprint data 503, the voice data 504, the odor/scent data 505, the facial image data 506, and/or the location data 507 of the user and/or the operating environment. The safe case 120 then determines an authentication score of the user based on the traits, e.g., by assigning weights and/or calculating deviations from known patterns, etc. The safe case 120 then modifies the matrix 134 based on the authentication score. For example, when the authentication score is above a threshold, the exemplary entry in the matrix 134 allows local application communications between application 1 and application 2 on the personal communication device 110-1. On the other hand, the safe case 120 re-evaluates the authentication score based on real time traits data, and in response to the authentication score below a threshold, the safe case 120 updates the matrix 134 to not allow local application communications between application 1 and application 2.

In some embodiments, as represented by block 690, the method 600 includes receiving a message from a remote server instructing the first apparatus to update the matrix, and updating the matrix in response to receiving the message, including updating conditions associated with whether or not to allow communications from the first application to the second application. In such embodiments, as represented by block 692, the method 600 further includes sending traits of a user of the second apparatus to the remote server, and receiving the message in accordance with the remote server, based on aggregated traits from a plurality of users and the traits of the user, determining that an authentication score of the user is below a threshold.

For example, in FIG. 5, the remote server 105 can obtain traits data from the plurality of safe cases 120. In some embodiments, the server 105 further analyzes aggregated traits data, e.g., by applying machine learning to extract features from the traits data. In some embodiments, the server 105 uses the aggregated data and the traits data from a particular user to determine an authentication score for the particular user of the personal communication device 110. In some embodiments, the remote server 105 then directs one or more safe cases 120 to re-configure the respective one or more matrices 134 based on the authentication score, e.g., re-configuring the matrix 134-1 on the safe case 120-1 based on the authentication score for the user of the personal communication device 110-1, etc. For instance, the exemplary matrix 134-1 can be re-configured so that the action taken in response to a request for local application communication from application 1 to application 2 can be re-configured from allowed to not allowed. In another example, the policies in the matrix 134-1 can be re-configured so that the conditions to be met for allowing a request for local application communication from application 1 to application 2 are re-configured, e.g., after a threshold amount of time, within a threshold distance from a geofence, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at a first apparatus with a housing arranged to hold a second apparatus, a controller, a communication interface, and a non-transitory memory storing a matrix:
detecting, via the communication interface, a request originating from a first application executing on the second apparatus to communicate with a second application on the second apparatus;
determining whether or not to allow the request based on the matrix; and
allowing transportation of packets from the first application to the second application in accordance with a determination of allowing the request.

2. The method of claim 1, wherein:
detecting the request originating from the first application includes receiving, via a bridge application, the request originating from the first application; and
allowing transportation of the packets includes instructing the bridge application to transport the packets from the first application to the second application.

3. The method of claim 1, further comprising:
discarding the packets from the first application to the second application in accordance with a determination of not allowing the request.

4. The method of claim 1, further comprising:
classifying a plurality of applications on the second apparatus into one or more domains; and
recording the one or more domains in the matrix, wherein an application of the plurality of applications is allowed or denied to communicate with applications within a domain of the one or more domains.

5. The method of claim 4, further comprising:
combining the plurality of applications into one or more packages; and
associating the one or more packages with the one or more domains.

6. The method of claim 1, wherein the non-transitory memory includes a secure storage storing keys associated with the request.

7. The method of claim 6, further comprising:
obtaining one or more certificates based on the keys in response to receiving the request; and
encrypting packets for communication from the first application to the second application using the one or more certificates.

8. The method of claim 1, further comprising:
determining an authentication score of a user of the second apparatus based on traits of the user; and
updating the matrix based on the authentication score.

9. The method of claim 1, further comprising:
receiving a message from a remote server instructing the first apparatus to update the matrix; and
updating the matrix in response to receiving the message, including updating conditions associated with whether or not to allow communications from the first application to the second application.

10. The method of claim 9, further comprising:
sending traits of a user of the second apparatus to the remote server; and
receiving the message in accordance with the remote server, based on aggregated traits of a plurality of users and the traits of the user, determining that an authentication score of the user is below a threshold.

11. An apparatus comprising:
a housing arranged to hold a personal communication device;
a communication interface at least partially supported by the housing and connectable to the personal communication device;
a non-transitory memory storing a matrix; and
a controller, coupled to the communication interface and the non-transitory memory, operable to:
detect, via the communication interface, a request originating from a first application executing on the second apparatus to communicate with a second application on the personal communication device;

determine whether or not to allow the request based on the matrix; and allow transportation of packets from the first application to the second application in accordance with a determination of allowing the request.

12. The apparatus of claim 11, wherein:

detecting the request originating from the first application includes receiving, via a bridge application, the request originating from the first application; and allowing transportation of the packets includes instructing the bridge application to transport the packets from the first application to the second application.

13. The apparatus of claim 11, wherein the controller is further operable to:

discard the packets from the first application to the second application in accordance with a determination of not allowing the request.

14. The apparatus of claim 11, wherein the controller is further operable to:

classify a plurality of applications on the second apparatus into one or more domains; and record the one or more domains in the matrix, wherein an application of the plurality of applications is allowed or denied to communicate with applications within a domain of the one or more domains.

15. The apparatus of claim 14, wherein the controller is further operable to:

combine the plurality of applications into one or more packages; and associate the one or more packages with the one or more domains.

16. The apparatus of claim 11, wherein the non-transitory memory includes a secure storage storing keys associated with the request.

17. The apparatus of claim 16, wherein the controller is further operable to:

obtain one or more certificates based on the keys in response to receiving the request; and encrypt packets for communication from the first application to the second application using the one or more certificates.

18. The apparatus of claim 11, wherein the controller is further operable to:

determine an authentication score of a user of the second apparatus based on traits of the user; and update the matrix based on the authentication score.

19. The apparatus of claim 11, further comprising a remote communication device at least partially supported by the housing, wherein the controller is further operable to:

receive, via the remote communication device, a message from a remote server instructing the first apparatus to update the matrix; and update the matrix in response to receiving the message, including updating conditions associated with whether or not to allow communications from the first application to the second application.

20. The apparatus of claim 19, further comprising:

sending, via the remote communication device, traits of a user of the second apparatus to the remote server; and receiving, via the remote communication device, the message in accordance with the remote server, based on aggregated traits of a plurality of users and the traits of the user, determining that an authentication score of the user is below a threshold.

* * * * *